US006417965B1

(12) United States Patent
Ye et al.

(10) Patent No.: US 6,417,965 B1
(45) Date of Patent: Jul. 9, 2002

(54) OPTICAL AMPLIFIER CONTROL SYSTEM

(75) Inventors: Jun Ye, Palo Alto; John S. Pease, Santa Clara; Michael J. Gassner, San Jose, all of CA (US)

(73) Assignee: Onetta, Inc., Sunnyvale, CA (US)

( * ) Notice: Subject to any disclaimer, the term of this patent is extended or adjusted under 35 U.S.C. 154(b) by 0 days.

(21) Appl. No.: 09/784,086

(22) Filed: Feb. 16, 2001

(51) Int. Cl.[7] .................................................. H01S 3/00
(52) U.S. Cl. ................................ 359/341.41; 359/341.4
(58) Field of Search ........................... 359/341.41, 341.4

(56) References Cited

U.S. PATENT DOCUMENTS

| | | | |
|---|---|---|---|
| 4,918,396 A | 4/1990 | Halemane et al. | ............ 330/4.3 |
| 5,321,541 A | 6/1994 | Cohen | ......................... 359/127 |
| 5,513,029 A | 4/1996 | Roberts | ....................... 359/177 |
| 5,654,816 A | 8/1997 | Fishman | ...................... 359/177 |
| 5,655,068 A | 8/1997 | Opoczynski | ............ 395/182.02 |
| 5,673,280 A | 9/1997 | Grubb et al. | ................... 372/3 |
| 5,703,711 A | * 12/1997 | Hamada | ...................... 359/341 |
| 5,859,938 A | 1/1999 | Nabeyama et al. | ............ 385/24 |
| 5,900,969 A | 5/1999 | Srivastava et al. | .......... 359/341 |
| 6,031,660 A | * 2/2000 | Park et al. | .................... 359/341 |
| 6,049,413 A | 4/2000 | Taylor et al. | ................. 359/337 |
| 6,061,171 A | 5/2000 | Taylor et al. | ................. 359/341 |
| 6,081,366 A | 6/2000 | Kidorf et al. | ................ 359/341 |
| 6,094,298 A | 7/2000 | Luo et al. | ..................... 359/346 |
| 6,115,174 A | 9/2000 | Grubb et al. | ................ 359/334 |
| 6,134,047 A | 10/2000 | Flood et al. | ................. 359/341 |
| 6,178,038 B1 | 1/2001 | Taylor et al. | ................. 359/341 |
| 6,198,572 B1 | 3/2001 | Sugaya et al. | ................ 359/337 |
| 6,215,581 B1 | 4/2001 | Yadlowsky | .................. 359/337 |

FOREIGN PATENT DOCUMENTS

| | | |
|---|---|---|
| WO | WO 00/14909 | 3/2000 |
| WO | WO 00/49721 | 8/2000 |

OTHER PUBLICATIONS

Sun et al. "Optical Fiber Amplifiers for WDM Optical Networks" Bell Labs Journal, p. 187–206, Jan.–Mar., 1999.

Sun et al. "Ultra Wide Band Erbium–Doped Fiber Amplifier with 80nm of Bandwidth" OSA Trends in Optics and Photonics, vol. 16 1997.

Ono et al. "Automatic Gain Control in Silica–Based EDFA with over 50nm Flat Gain Bandwidth using an all Optical Feedback Loop" 10th Optical Amplifiers and their Applications Technical Digest, Jun. 9–11, 1999.

Takeda et al. "Active Gain Tilt Equalization by Preferentially 1.43$\mu$m– or 1.48$\mu$m– Pumped Raman Amplification" OSA Optical Amplifiers and their Applications, vol. 30, p. 101–105 (1999).

Kakui et al. "Dynamic–Gain–Tilt–Free Long–Wavelength Band Erbium Doped Fiber Amplifiers Utilizing Temperature Dependent Characteristics of Gain Spectrum" 25th Optical Fiber Communication Conference, Technical Digest, p. 6–8, (Mar. 8, 2000).

Masuda "Review of Wideband Hybrid Amplifiers" 25th Optical Fiber Communication Conference, Technical Digest, p. 2–4, (Mar. 7, 2000).

Lewis et al. "Low–Noise High Gain Dispersion Compensating Broadband Raman Amplifier" 25th Optical Fiber Communication Conference, Technical Digest, p. 5–7, (Mar. 7, 2000).

Nortel Networks Datasheet "MGM Multiwavelength Gain Module" (Nov. 3, 2000).

Sun et al. "Average Inversion Level, Modeling and Physics of Erbium–Doped Fiber Amplifiers" IEEE Journal of Selected Topics in Quantum Electronics, vol. 3, No. 4, Aug. 1997.

* cited by examiner

*Primary Examiner*—Mark Hellner
(74) *Attorney, Agent, or Firm*—Fish & Neave; G. Victor Treyz (57) ABSTRACT

An optical amplifier control system provides real-time control of an optical amplifier in response to an analog signal having a large dynamic range. The optical amplifier control system uses a non-linear analog-to-digital converter, such as a logarithmic-scale analog-to-digital converter to achieve low relative quantization error. The amplifier control system may also use multiple analog-to-digital converters.

16 Claims, 8 Drawing Sheets

FIGURE 8B

OPTICAL AMPLIFIER CONTROL SYSTEM

BACKGROUND OF THE INVENTION

The present invention relates to the control of an optical amplifier, and more particularly, to ways in which to monitor and control an optical amplifier for use in fiber-optic communications systems.

Optical amplifiers are used to amplify optical signals. A typical optical amplifier may be based on fiber that has been doped with rare-earth elements such as erbium. Fiber amplifiers are typically pumped by diode lasers.

In some cases, it is desirable to control an optical amplifier in real-time based on an analog input signal to achieve a particular amplification characteristic. However, this is difficult to do, particularly when the analog input signal varies over a large dynamic range. Consider for example a fiber-optic communication system that transmits wavelength division multiplexed (WDM) signals, in which multiple wavelengths of light are used to support multiple communications channels on a single fiber. An optical amplifier used to amplify such a WDM signal should be controlled to maintain constant per channel gain even if the power of the WDM signal changes, for example, due to a fiber cut, an equipment failure, or channel add/drop.

WDM systems are expected to support as many as 40 WDM channels, 160 channel systems in the future. Each WDM channel carries an optical signal that may vary in power from zero to some maximum value. For example, in some situations, a weak signal carried in an optical channel may have one-sixth (⅙) the power of a strong signal. Consequently, the power of a WDM signal may vary over a large range of powers. It is difficult to control an optical amplifier to maintain a constant gain per channel when the input power varies over such a large range.

It is an object of the present invention to provide low-error, real-time control of an optical amplifier in response to an analog input signal having a large dynamic range.

SUMMARY OF THE INVENTION

These and other objects of the invention are accomplished in accordance with the principles of the present invention by providing an optical amplifier with an amplifier control that is capable of responding to an analog input signal having a large dynamic range with low relative quantization error. According to one exemplary embodiment, the amplifier control includes a non-linear scale analog-to-digital converter that produces a digital signal in which the increment between successive bits tracks a non-linear scale rather than a linear scale. For example, the non-linear scale analog-to-digital converter may be a logarithmic scale analog-to-digital converter, in which the increment between successive bits tracks a logarithmic scale.

According to a further exemplary embodiment, multiple analog-to-digital converters are used to produce digital signals corresponding to different scales. A controller selects the output of one of the analog-to-digital converters to generate control signals for controlling the optical amplifier.

The amplifier control of the present invention may be responsive to any analog input signal. For example, the amplifier control may be responsive to the optical input signals supplied to the optical amplifier, the amplified output signals produced by the optical amplifier, or both. Alternatively, or in addition, the amplifier control may be responsive to optical signals elsewhere in an optical system.

The amplifier control of the present invention may be used to control various types of optical amplifiers, such as rare earth-doped fiber amplifier, Raman amplifiers, parametric amplifiers, and/or semiconductor optical amplifiers, to name a few. The amplifier control may control a variety of optical amplifier parameters. For example, the amplifier control may control the pump power applied to an erbium-doped fiber amplifier (EDFA). Alternatively, the amplifier control may control the bias voltage of a semiconductor optical amplifier.

The optical amplifier may be used in various optical systems. One suitable system is a WDM fiber-optic transmission system. For example, the optical amplifier with optical control may be used to amplify WDM optical signals at points between network nodes. The optical amplifier control can control the optical amplifier to approximate a constant optical gain per channel for a large number of channels, even if channels are added or dropped.

Further features of the invention and its nature and various advantages will be more apparent from the accompanying drawings and the following detailed description of the preferred embodiments.

DETAILED DESCRIPTION OF THE PREFERRED EMBODIMENTS

Figure 1:
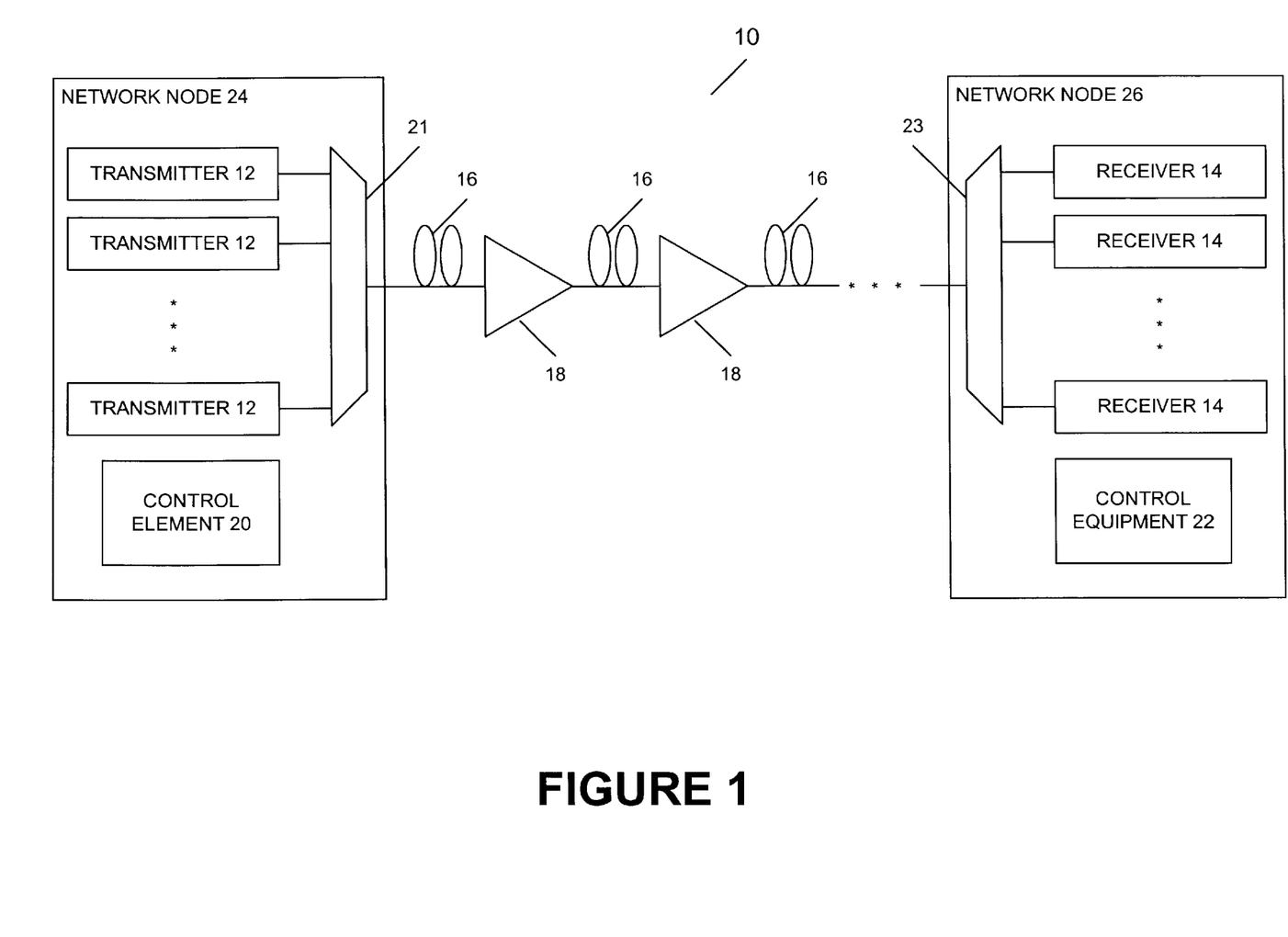
FIG. 1 is a schematic diagram of an illustrative optical communications system link in accordance with the present invention.

An illustrative optical communications link 10 in accordance with the present invention is shown in FIG. 1. As shown in FIG. 1, the optical communications link 10 may be used to support wavelength-division-multiplexing (WDM) arrangements in which multiple communications channels are provided using multiple wavelengths of light. For example, the link of FIG. 1 may support a system with 40 channels, each channel using a different optical carrier wavelength. Optical channels may be modulated at, for example, approximately 10 Gbps (OC-192). The carrier wavelengths that are used may be in the vicinity of 1530–1560 nm. These are merely illustrative system characteristics. If desired, more channels may be provided (e.g., hundreds of channels), signals may be modulated at higher data rates (e.g., approximately 40 Gbps for OC-768) or lower data rates (e.g., approximately 2.5 Gbps for OC-48), or a wider range of carrier wavelengths may be supported (e.g., 1480–1610 nm).

More particularly, optical communications link 10 spans a first network node 24 and a second network node 26. Network nodes 24 and 26 may be two nodes of a larger optical communications network system containing any number of nodes. Network node 24 includes a plurality of transmitters 12 and computer equipment 20. Each transmitter 12 generates an optical signal having a different carrier wavelength. For example, the transmitters 12 may be distributed feedback laser diodes operating at different wavelengths. Alternatively, the transmitters 12 may include laser diodes operating at the same wavelength and wavelength converters for converting optical signals from the laser diodes to different carrier wavelengths appropriate for transmission.

The optical signals from transmitters 12 are provided to a wavelength division multiplexer 21, which combines the optical signals to produce a WDM optical signal. The wavelength division multiplexer 21 may be, for example, an arrayed waveguide-type or a thin film filter-type multiplexer.

WDM optical signals may be transmitted over a series of fiber links. Each fiber link may include a span 16 of optical fiber. Fiber spans may be on the order of 40–120 km in length for long-haul networks or may be any other suitable length for use in signal transmission in an optical communications network.

Optical amplifier systems 18 may be disposed between spans 16. For example, as optical signals travel along the optical fibers 16, signal strength is attenuated. Accordingly, optical amplifier system 18 may amplify the optical signals between successive spans of fiber. Of course, other optical equipment may be provided along the communication link 10, for example, an add/drop module, a switch, a router, or other optical device, or a combination of the foregoing.

WDM optical signals may be received at network node 26. The WDM optical signals may be demultiplexed into a plurality of optical signals by wavelength division demultiplexer 23. The plurality of output signals may be provided, respectively, to a plurality of receivers 14. Each receiver 14 may include, for example, a PIN diode coupled to a transimpedance amplifier.

One or more telemetry channels may be used for monitoring and controlling system components, rather than carrying network data traffic. Such telemetry channels may be used, for example, to allow control equipment such as control equipment 20 and 22 at network nodes 24 and 26 or at central offices to communicate with system components such as optical amplifier system 18. Control equipment 20 and 22 may be, for example, computers or computer systems. As an example, a telemetry channel operating at a wavelength of 1510 nm may be used for monitoring and control functions. This is, however, merely illustrative. Any wavelength or wavelengths may be used to support supervisory or network management and control functions if desired.

With the arrangement of FIG. 1, status information from optical amplifier systems 18 may be passed to network control and management software running on control equipment 22 using the telemetry channel. The telemetry channel of a link between node 26 and node 24 that is arranged to support communications in the opposite direction from link 10 may be used to provide this status information to network control and management software running on control equipment 20.

Control commands for adjusting the operation of optical amplifier systems 18 may be generated by the network software running on control equipment 20. The control commands may be transmitted by a transmitter 12 on the telemetry channel and received by the appropriate amplifier system 18.

Figure 2:
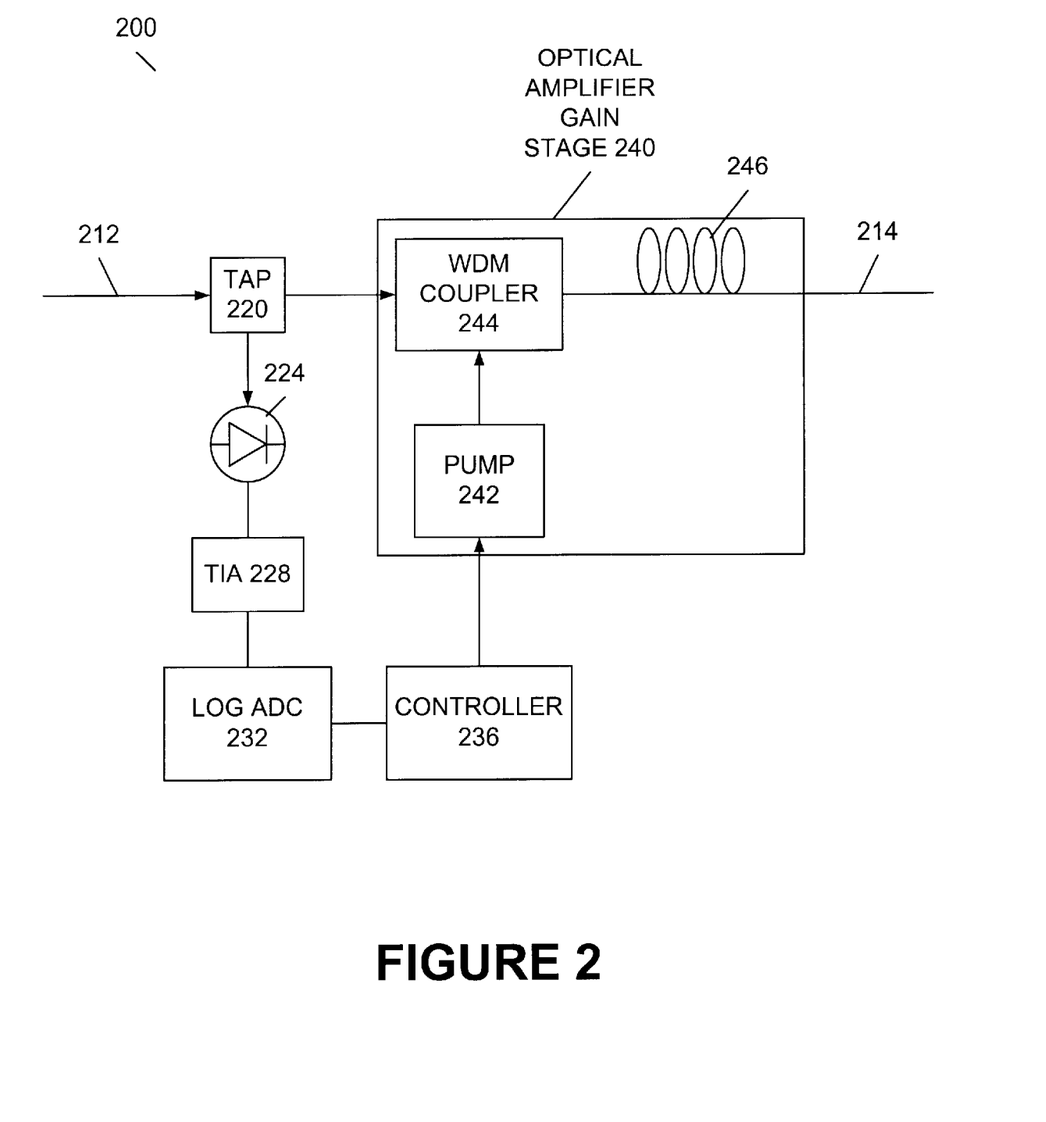
FIG. 2 is a diagram of an illustrative embodiment of an optical amplifier in accordance with the present invention.

FIG. 2 provides an illustrative embodiment of an optical amplifier 200 according to the present invention. Optical amplifier 200 may include one or more gain stages, which may produce gain using any of several types of gain media. FIG. 2 illustrates a single amplifier stage by way of example, but may include additional stages if desired. Optical amplifier 200 may form at least a portion of optical amplifier system 18 described in connection with FIG. 1. However, it should be understood that optical amplifier 200 may be used in contexts other than that shown in FIG. 1.

As shown in FIG. 2, optical input signals from input 212 are provided to an optical tap 220. The optical signals may be, for example, WDM optical signals having multiple channels or any other optical signal. Optical tap 220 may be any suitable optical tap. For example, tap 220 may be a low-loss tap that is relatively wavelength insensitive. Tap 220 may be, for example, a 2%/98% tap that directs 2% of the output power from input 212 to photodiode 224 and that directs 98% of the output power from input 212 to optical amplifier gain stage 240.

Photodiode 224 converts optical signals received from tap 224 to an electric current. The electric current may be, for example, indicative of the optical power on the input 212. Photodiode 224 may be a PIN diode. Of course, photodiode 224 may be replaced by any suitable photodetector. Transimpedance amplifier 228 converts the electric current from photodiode 224 to an analog voltage signal and supplies the analog signal to logarithmic-scale analog-to-digital converter (log analog-to-digital converter) 232.

The log analog-to-digital converter 232 may be selected to generate a sufficient number of output bits to cover the dynamic range of the analog input signal, yet provide a sufficiently low relative quantization error, as described below. Log analog-to-digital converter 232 preferably samples the analog voltage signal from transimpedance amplifier 228 at a sufficiently high rate to permit adjustment of the operating characteristics (e.g., the pump power) of the optical amplifier stage 240. For an erbium-doped fiber amplifier, the analog voltage signal should be sampled at about 1–10 MHz. Of course, the sampling rate may vary depending on, among other things, the optical amplifier stage 240 used in the equipment and the result desired from the optical amplifier stage.

Log analog-to-digital converter 232 converts the analog signal to a digital signal based on a logarithmic scale. That is, the incremental value represented by successive bits tracks a logarithmic scale. Accordingly, for a 12-bit log analog-to-digital converter having 4096 different levels, the value of 2048 (i.e., 1000 0000 0000) corresponds to an analog input signal value significantly less than half of the dynamic range of that signal represented by 4095 (i.e., 1111 1111 1111 1111). By virtue of the logarithmic scale, the magnitude of quantization error for large analog signal values may be large. However, the quantization error will be relatively small compared to the magnitude of the large analog signal value, thus yielding a low relative quantization error. Small analog signal values will produce small quantization errors according to the logarithmic scale.

While a log analog-to-digital converter 232 is described, it should be understood that log analog-to-digital converter may be replaced by another linear or non-linear analog-to-digital converters so long as it provides a sufficient sampling rate, dynamic range, and low relative quantization error.

The digital signal from log analog-to-digital converter 232 is input to controller 236. Controller 236 may be a data processor, such as a computer or application specific integrated circuit, or other suitable control device. Responsive to the digital signal, controller 236 generates control signals to control an operating characteristic of optical amplifier stage 240. Of course, controller 236 may also control other optical amplifier stages, if optical amplifier 200 includes additional stages. Alternatively, multiple controllers may be provided to control multiple optical amplifier stages. For example, the controller 236 may generate control signals the control the pump power of the optical amplifier stage 240 to control transients in the optical gain of the amplifier stage 240.

Optical amplifier stage 240 amplifies input optical signals to generate an amplified optical signal at output 214. Optical amplifier stage 240 may be used to amplify optical signals at one or more wavelengths in a fiber-optic communication link. FIG. 2 shows optical amplifier stage 240 to include a pump laser 242, a WDM coupler 244, and a fiber coil 246. Control signals from controller 242 may be used to control the operation of pump laser 242, for example, to control the power output from the laser 242 to minimize the transient effects in the optical gain during channel add/drop events. For example, the pump power may be controlled so that the optical amplifier stage 240 produces a constant per channel gain. Pump laser 242 may be any suitable pump, such as a diode laser operating at 980 nm or 1480 nm.

WDM coupler 244 may be used to couple pump light from pump laser 242 into coil 246 while allowing optical signals (e.g., optical signals in the 1530–1560 nm wavelength range) from tap 220 to pass into coil 246 for amplification. Fiber coil 246 may be a rare earth-doped fiber, such as an erbium-doped fiber, that amplifies the optical input signal using the pump signal. The amplified output is provided at output 212.

Although FIG. 2 shows a co-pumped arrangement for pumping optical amplifier stage 240, this is merely illustrative. Fiber coil 246 may be counter-pumped, or both co-pumped and counter-pumped if desired. Moreover, any suitable number of coils or gain stages may be used on amplifier 200. Other components, such as filters, taps, switches, attenuators (e.g., variable optical attenuators), etc., may also be included in amplifier 200.

Optical amplifier stage 240 may be any type of optical amplifier, such as a Raman amplifier, a parametric amplifier, a semiconductor optical amplifier, or other optical amplifier, or a combination. Of course, the control signals may depend on the particular amplifier stage 240 selected.

When the power of the input optical signal varies, for example, as channels are added or dropped, the power variations are reflected in the current generated by photodiode 224 and the resulting analog voltage produced by transimpedance amplifier 228. Even when the input power varies over a large dynamic range, log analog-to-digital converter 232 can provide a digital signal within error tolerance to controller 236 to enable control of the optical amplifier stage 240.

While the example of FIG. 2 illustrates a tap 220 provided at the input of optical amplifier 200, it should be understood that other optical elements may be provided between tap 220 and optical amplifier stage 240. Alternatively or in addition, a tap, photodiode, transimpedance amplifier, and log analog-to-digital converter may be provided at the output of optical amplifier stage 240.

Figure 3:
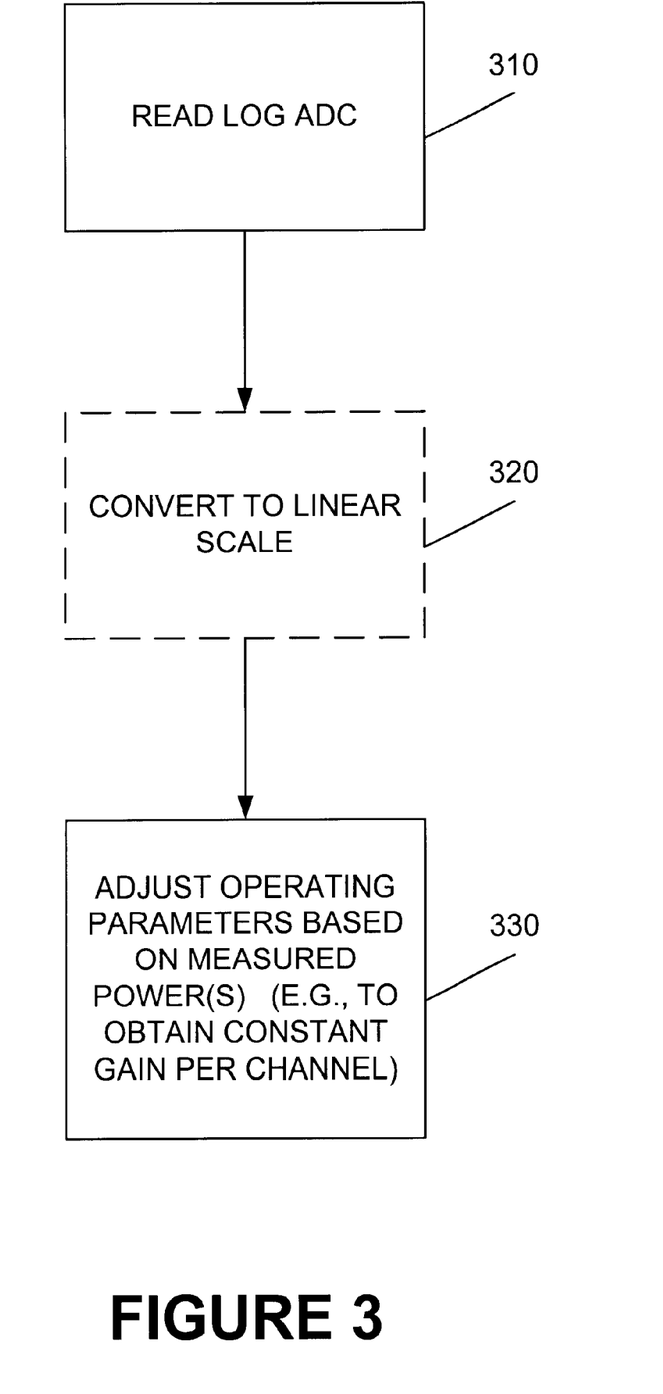
FIG. 3 provides an exemplary process flow for operating the controller of the optical amplifier of FIG. 2.

FIG. 3 provides an illustrative process flow that controller 236 may use to adjust the operating parameters of optical amplifier stage 240. At step 310, controller 236 reads the logarithmic-scale digital signals from log analog-to-digital converter 232. At step 320, controller 236 may convert the logarithmic-scale digital signal to a linear-scale digital signal. However, as suggested by dashed lines in FIG. 3, step 320 is not required.

At step 330, controller 236 generates control signals for adjusting one or more operating parameters of the optical amplifier stage 240 based on the logarithmic-scale digital signals or the converted digital signals. For example, controller 236 may generate the control signals using a look-up table or using pre-calibrated equations or relationships that correlate input digital signal values to the pump power to be used in the optical amplifier stage 240. According to one exemplary embodiment, the control signals may control optical amplifier to maintain or approximate a constant gain per channel in the amplified output signal. Of course, controller 236 may be designed or programmed to control optical amplifier stage 240 for other purposes, such as to maintain the total power output of the optical amplifier stage at a constant level.

Figure 4:
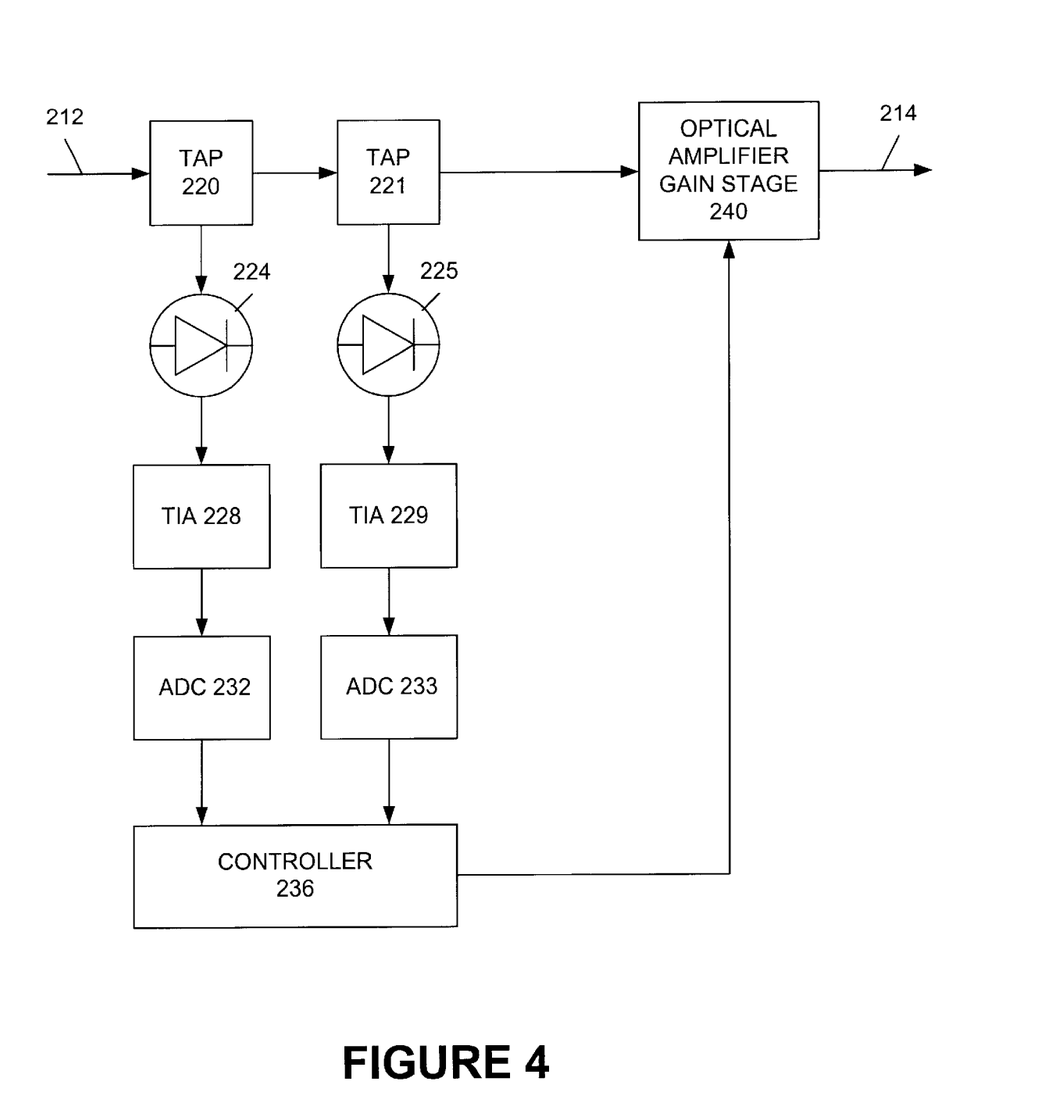
FIG. 4 is a diagram of a further illustrative embodiment of an optical amplifier in accordance with the present invention.

FIG. 4 illustrates a further exemplary embodiment of an optical amplifier. In the embodiment of FIG. 4, the optical amplifier includes two taps 220 and 221, two photodiodes 224 and 225, two transimpedance amplifiers 228 and 229, and two analog-to-digital converters 232 and 233.

An input optical signal on input 212 is supplied to the first tap 220. Tap 220 couples a portion of the optical power on input 212 to photodiode 224 and a portion of the optical power on input 212 to the second tap 221. Tap 221 couples a portion of the optical power received from tap 220 to photodiode 225 and a portion of the optical power received from tap 220 to optical amplifier stage 240. As noted above, optical taps 220 and 221 may be any suitable optical taps. For example, tap 220 may be a low-loss tap that is relatively wavelength insensitive. Taps 220 and 221 may be, for example, 2%/98% taps.

Photodiodes 224 and 225 detect the optical signals provided by taps 220 and 221, respectively, to generate analog electric currents. The electric currents may be indicative of the optical power of the input optical signal on input 212. Photodiode 224 supplies the electric current it generates to transimpedance amplifier 228. Transimpedance amplifier 228 converts the electric current to an analog voltage signal and supplies the analog voltage signal to analog-to-digital converter 232. Similarly, the electrical current from photodiode 225 is converted into an analog voltage signal by transimpedance amplifier 229 and the analog voltage signal is provided to analog-to-digital converter 233.

Analog-to-digital converters 232 and 233 generate digital outputs that are supplied to controller 236. Controller 236 selects one of the digital outputs from analog-to-digital converters 232 and 233 to generate control signals for controlling optical amplifier stage 240. Optical amplifier amplifies an optical signal received from tap 221 in accordance with the control signals generated by controller 236. The amplified optical signal is provided at output 214.

Either one or both of analog-to-digital converters 232 and 233 may be linear-scale analog-to-digital converters. Analog-to-digital converters 232 and 233 produce digital output signals with different scales so that together they cover the dynamic range of the analog input with reduced relative quantization error. This may be done in a number of ways as described below. In general, analog-to-digital converter 232 may generate an digital output signal with low relative quantization error for large analog signal values and analog-to-digital converter 233 may generate a digital output signal that saturates for large analog input values, but provides a digital output signal with low relative quantization error for small analog signal values.

The following example illustrates this principle. Assume that both analog-to-digital converter 232 and analog-to-digital converter 233 are 12-bit, linear-scale analog-to-digital converters and that the analog-to-digital converters 232 and 233 (and/or the components that precede analog-to-digital converters 232 and 233) are selected or set so that each bit of analog-to-digital converter 232 represents an increment sixteen times (16×) greater than the increment represented by a bit of analog-to-digital converter 233. Also assume that the dynamic range of the analog signal to be used for controlling the optical amplifier stage 240 is normalized to 65536 units (i.e., from 0 to 65535). As noted above, a 12-bit analog-to-digital converter provides 4096 distinct digital output levels. Therefore, each bit of the digital output signal of analog-to-digital converter 232 may be set to represent 16 units (65536/4096) of the analog signal. In other words, analog-to-digital converter 232 represents the analog signal in units of sixteen and can count the analog signal value in units of sixteen over the entire dynamic range of the analog signal from 0 to 65535. Further, the digital output signal of analog-to-digital converter 233 is set to cover only the first 4096 (32768/16) units of the analog signal. Analog-to-digital converter 233 saturates for analog signals above 4096 units. Accordingly, each bit of the digital output of analog-to-digital converter 233 represents 1 unit of the analog input signal. Thus, analog-to-digital converter 233 can count the analog signal in units of one, thereby providing greater resolution than analog-to-digital converter 232, but can only count the first 4096 units of the analog signal, i.e., from 0 to 4095.

When the analog signal is greater than or equal to 4095 units (or another predetermined value), the controller 236 may use the digital signal output from analog-to-digital converter 232 to generate the control signal for the optical amplifier stage 240. Note that the relative quantization error is a maximum of 8 units for an input analog signal of 4096 units. When the analog signal is below 4095 (or the predetermined value), the controller 236 may use the digital output from analog-to-digital converter 233 to generate control signals for the optical amplifier stage 240. Accordingly, analog signals below 4096 can be accurately represented to the nearest 1 unit. Analog signals from 4096 to 65536 may be represented using analog-to-digital converter 232.

With respect to FIG. 4, the parameters of taps 220, 221, photodiodes 224, 225, transimpedance amplifiers 228, 229 and/or analog-to-digital converters 232, 233 may be selected so that the digital output of analog-to-digital converter 232 covers the entire dynamic range of the input optical signal at 212 and so that analog-to-digital converter 233 covers a portion of the dynamic range of the input optical signal with greater resolution than provided by analog-to-digital converter 232. For example, tap 221 may tap more power than tap 220, photodiode 225 may generate a larger current for the same input optical power than does photodiode 224, transimpedance amplifier 229 may generate a larger analog voltage signal than transimpedance amplifier 228 for the same input current, analog-to-digital converter 233 may be responsive to a smaller range of input values than analog-to-digital converter 232, and/or other equipment may be provided to produce the desired effect. Thus, for input optical signal having large power values, controller 236 may generate amplifier control signals based on the digital signal output of analog-to-digital converter 232. For low power levels of input optical signal, controller 236 may generate amplifier control signals based on the digital signal output from analog-to-digital converter 233.

Figure 5:
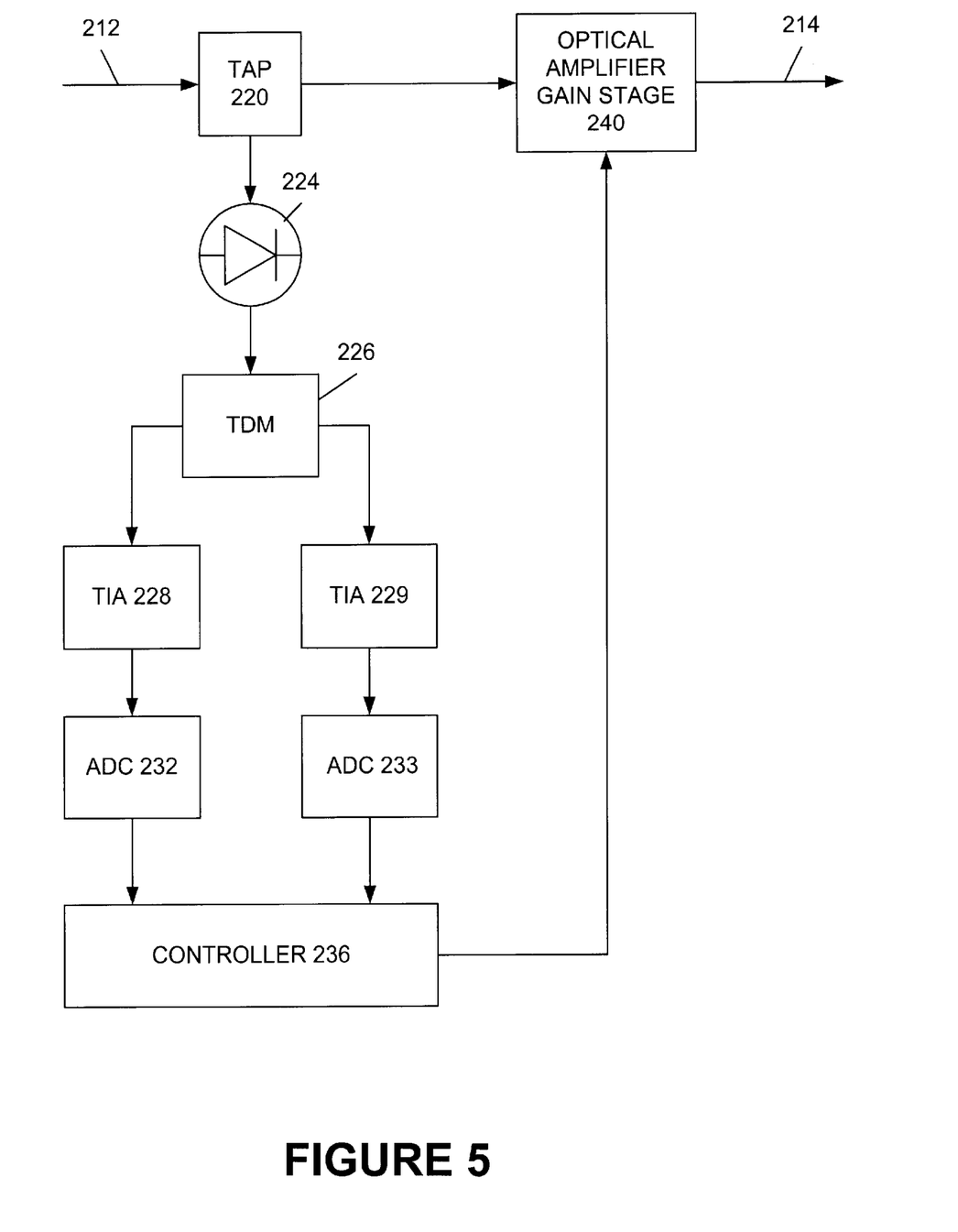
FIG. 5 is a diagram of a further illustrative embodiment of an optical amplifier in accordance with the present invention.

FIG. 5 illustrates a further exemplary embodiment of an optical amplifier. In the embodiment of FIG. 5, the optical amplifier includes a tap 220, a photodiode 224, a time division multiplexer (TDM) 226, two transimpedance amplifiers 228 and 229, and two analog-to-digital converters 232 and 233.

In accordance with FIG. 5, the analog output current of photodiode 224 is provided to a TDM 226. TDM 226 may be implemented using, for example, one or more field effect transistors (FETs). The TDM 226 alternately couples the output current signal between to two outputs. This effectively permits the output current to be provided to the two outputs. A first output is provided to transimpedance amplifier 228 and a second output is provided to transimpedance amplifier 229. TDM 226 may be replaced by a splitter or other suitable device for providing the two outputs.

As described above in connection with FIG. 4, transimpedance amplifiers 228 and 229 convert their respective analog input current signals to analog voltage signals. Transimpedance amplifier 228 supplies its analog output voltage to analog-to-digital converter 232 and transimpedance amplifier 229 supplies its analog output voltage to analog-to-digital converter 233. Analog-to-digital converters 232 and 233 convert the analog output voltages to digital signals and supply the digital signals to controller 236. Controller 236 selects digital output signal from either analog-to-digital converter 232 or analog-to-digital converter 233 and, responsive to the selected digital output signal, generates control signals for controlling optical amplifier stage 240.

In the embodiment of FIG. 5, transimpedance amplifiers 228 and 229 and/or analog-to-digital converters 232 and 233 may be selected so that the output of analog-to-digital converter 232 covers the entire dynamic range of the output of photodiode 224 and so that the output of analog-to-digital converter 233 covers a portion of the dynamic range of the output of photodiode 224, but with increased resolution compared to analog-to-digital converter 232.

If analog-to-digital converters 232 and 233 are identical, transimpedance amplifiers 228 and 229 may be set so that amplifier 229 outputs an analog voltage signal that saturates analog-to-digital converter 233 at a desired voltage level. Amplifier 228 may be set so that the digital output of analog-to-digital converter 232 covers the full dynamic range of the analog voltage signal applied to it without saturating.

Figure 6:
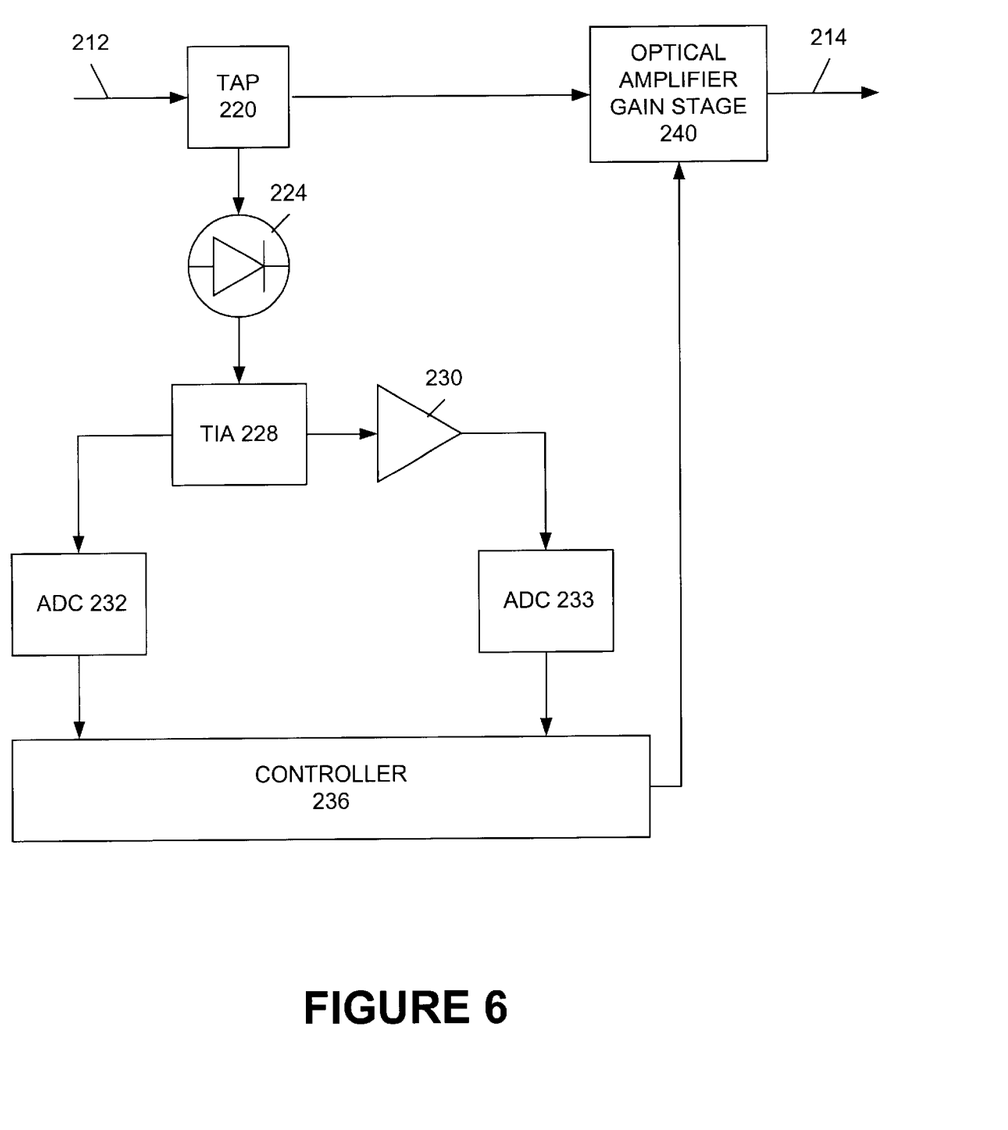
FIG. 6 is a diagram of a further illustrative embodiment of an optical amplifier in accordance with the present invention.

FIG. 6 illustrates a further exemplary embodiment of an optical amplifier. In the embodiment of FIG. 6, the optical amplifier includes a tap 220, a photodiode 224, a transimpedance amplifier 228, and amplifier 230, and two analog-to-digital converters 232 and 233.

In accordance with FIG. 6, the analog output current of photodiode 224 is provided to transimpedance amplifier 228. Transimpedance amplifier converts the analog output current to an analog voltage signal and provides the analog voltage signal to analog-to-digital converter 232 and to amplifier 230. Analog-to-digital converter 232 generates a digital signal responsive to the analog voltage signal and supplies the digital signal to controller 236.

Amplifier 230 amplifies the analog voltage signal and supplies the amplified analog voltage signal to analog-todigital converter 233. Analog-to-digital converter 233 generates a digital signal responsive to the analog voltage signal and supplies the digital signal to controller 236. Controller 236 selects digital output signal from either analog-to-digital converter 232 or analog-to-digital converter 233 and, responsive to the selected digital output signal, generates control signals for controlling optical amplifier stage 240.

In the exemplary embodiment of FIG. 6, the amplification factor of amplifier 230 may be set so that analog-to-digital converter 232 covers the full dynamic range of the analog voltage signal output from transimpedance amplifier 228 without saturating and so that analog-to-digital converter 233 saturates at a desired voltage level in the dynamic range of the analog voltage signal. For analog voltage signals below the desired voltage level, amplifier 230 amplifies the analog voltage and provides the amplified voltage to analog-to-digital converter 233. Analog-to-digital converter 233 is capable of producing a high-resolution digital signal from the amplified analog voltage without saturating. Controller 236 may therefore select the digital signal from analog-to-digital converter 233 to produce the control signals for amplifier stage 240.

If the analog voltage from transimpedance amplifier 228 is at or above the desired voltage level, analog-to-digital converter 232 can digitize the analog voltage with sufficiently low quantization error. The amplified voltage from amplifier 230 saturates analog-to-digital converter 233 (e.g., its output is 1111 1111 1111). Controller therefore selects the digital signal from analog-to-digital converter 232 to produce the control signals for amplifier stage 240.

In the embodiment of FIG. 6 as well as in the other embodiments described herein, the controller 236 need not wait until analog-to-digital converter 233 saturates before it selects the output of analog-to-digital converter 232. For example, controller 236 may select the output of analog-to-digital converter 232 when the output of analog-to-digital converter 233 reaches, e.g., 4000 (1111 1010 0000), before its saturation level. This may be useful, particularly where delays exist, to anticipate and therefore avoid saturation.

Alternatively, the embodiment of FIG. 6 may be designed so that the output of transimpedance amplifier 228 saturates analog-to-digital converter 232 at a desired voltage level in the dynamic range of the analog voltage signal. The amplification factor of amplifier 230 may be set to reduce the output of transimpedance amplifier 228 so that analog-to-digital converter 233 covers the full dynamic range of the analog voltage signal output from transimpedance amplifier 228 without saturating. Thus, for analog voltage signals below the desired voltage level (or a predetermined threshold level), analog-to-digital converter 232 is capable of producing a high-resolution digital signal without saturating. Controller 236 may therefore select the digital signal from analog-to-digital converter 232 to produce the control signals for amplifier stage 240.

If the analog voltage signals from transimpedance amplifier 228 are at or above the desired voltage level (or the predetermined threshold level), amplifier 230 "amplifies" the analog voltage and provides the amplified voltage to analog-to-digital converter 233. Analog-to-digital converter 233 is capable of producing a digital signal with sufficiently low quantization from the amplified analog voltage without saturating. Controller 236 therefore selects the digital signal from analog-to-digital converter 233 to produce the control signals for amplifier stage 240.

Figure 7:
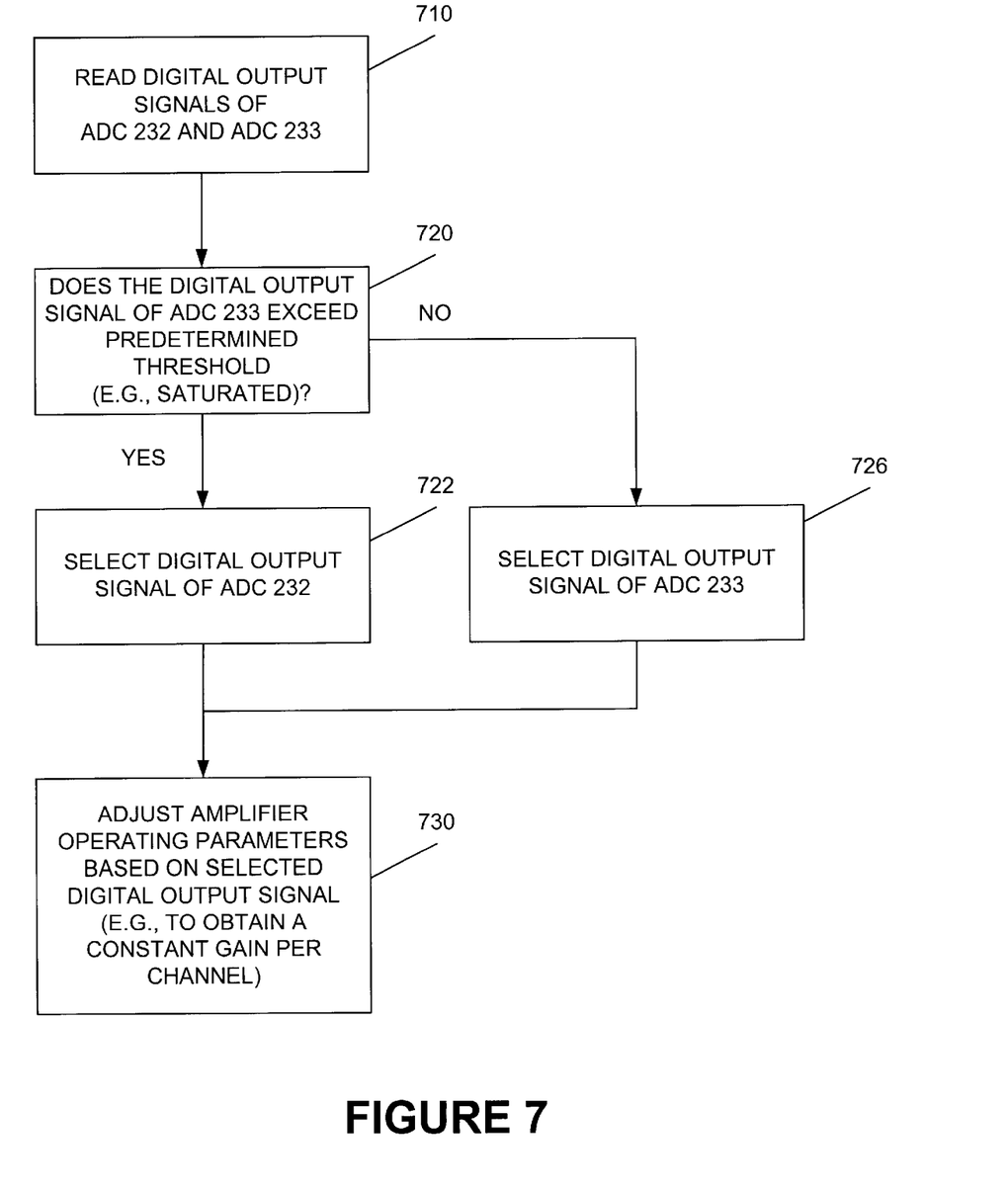
FIG. 7 provides an exemplary process flow for operating the controller of an optical amplifier in accordance with FIGS. 4, 5, or 6.

FIG. 7 provides an illustrative process flow that controller 236 may use to adjust the operating parameters of optical amplifier stage 240 that may be used in connection with any of the illustrative embodiments of FIGS. 4, 5, and 6. At step 710, controller 236 reads the digital signals from analog-to-digital converter 232 and analog-to-digital converter 233. At step 720, controller 236 determines whether the digital signal from analog-to-digital converter 233 exceeds a predetermined threshold, which may be saturation level (e.g., all ones) or a value below the saturation level, such as the binary equivalent of 4000. If so, controller 236 selects the digital output from analog-to-digital converter 232, as indicated at step 722. If the digital signal from analog-to-digital converter 233 is below the threshold level, e.g., is not saturated or is at a value below the saturation level, such as the binary equivalent of 4000, then controller 236 selects the digital output from analog-to-digital converter 233, as indicated at step 726.

At step 730, controller 236 generates control signals for adjusting one or more operating parameters of the optical amplifier stage 240 based on the selected digital signals. For example, controller 236 may generate the control signals using a look-up table that correlates input digital signal values to control data for controlling the optical amplifier stage 240. Alternatively, controller 236 may calculate the control signals using an appropriate equation or other relationship. According to one exemplary embodiment, the control signals may control optical amplifier to maintain a constant gain per channel in the amplified output signal. Of course, controller 236 may be designed or programmed to control optical amplifier stage 240 for other purposes, as noted above.

Figure 8A:
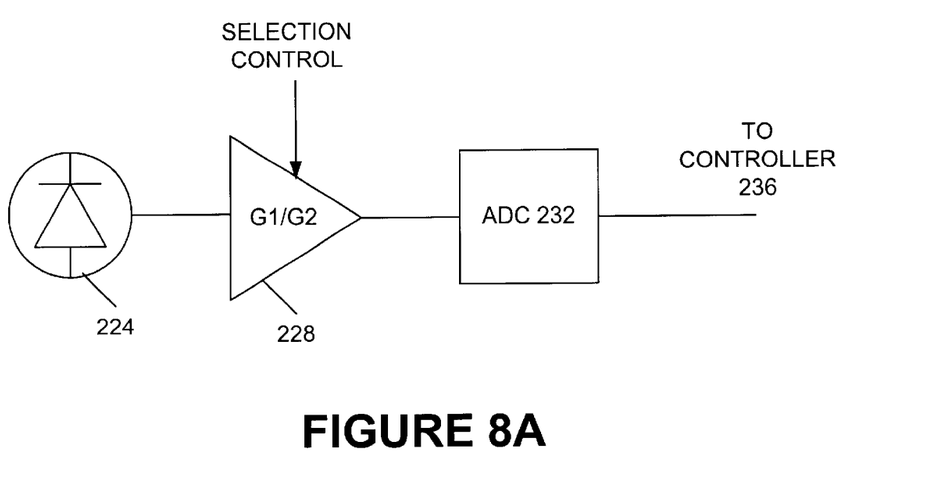
FIG. 8A is a diagram of a further illustrative embodiment of an optical detector in accordance with the present invention.

FIG. 8A illustrates an embodiment of an optical detector that may be used in connection with the present invention. The optical detector shown in FIG. 8A may be provided, for example, between a tap 220 and a controller 236 as illustrated in the embodiments described above. As shown in FIG. 8A, photodetector 224 provides an output to a transimpedance amplifier 228 that produces multiple gain values. For example, transimpedance amplifier 228 may be controlled to produce a gain G1 or a gain G2. The output of transimpedance amplifier 228 is provided to analog-to-digital converter (ADC) 232. A selection control signal, for example, produced by controller 236, may be used to select between the multiple gain values supported by amplifier 228. The output of analog-to-digital converter 232 may be provided to controller 236.

In the optical detector of FIG. 8A, the gain of the transimpedance amplifier 228 may be selected to provide an appropriately scaled input to the analog-to-digital converter 232. For example, if photodetector 224 outputs a relatively small signal, the selection control signal may be used to select a gain G1 for transimpedance amplifier 228. The gain G1 produced by amplifier 228 may be sufficient to saturate analog-to-digital converter 232 when the output of photodetector 224 reaches a predetermined fraction of the expected dynamic range of the output of photodetector 224 for the application. Gain G1 enables amplifier 228 to provide an output large enough for analog-to-digital converter 232 to produce a digital output with low quantization error, even when the output signal of photodetector is relatively small. The selection control signal may select gain G1 when the output of photodetector 224 is below a predetermined threshold. The predetermined threshold is preferably the same as or less than the value that, when applied through amplifier 228 at gain G1, would saturate the analog-to-digital converter 232.

The selection control signal may select a smaller gain value G2 when the output of photodetector 224 exceeds the predetermined threshold. Using gain value G2, amplifier 228 may produce an output that does not saturate analog-to-digital converter 232 even when photodetector 224 outputs a relatively large signal.

Accordingly, the optical detector of FIG. 8A may be operated so that amplifier 228 produces a gain G1 when the output of photodetector 224 is below a predetermined threshold and a gain G2 when the output of photodetector 224 is above the predetermined threshold. In this way, the output of analog-to-digital converter 232 may have low quantization error when the output of photodetector 224 is relatively small and still permit analog-to-digital converter 232 to produce an unsaturated output over the entire desired dynamic range of the photodetector output. Controller 236 may recognize and respond appropriately to the digitized output of the analog-to-digital converter 232 depending on whether a gain G1 or a gain G2 is selected.

The controller 236 may be used to produce the selection control signal. The selection control signal may be produced responsive to a signal from the photodetector 224, the amplifier 312, and/or the analog-to-digital converter 232. For example, if gain G1 is selected and the output value of analog-to-digital converter 232 reaches a given threshold value and shows an increasing trend, a selection control signal may be generated to switch to gain G2. Similarly, if gain G2 is selected and the output value of analog-to-digital converter 232 reaches a given threshold value and shows a decreasing trend, a selection control signal may be generated to switch to gain G1. The threshold for switching from G1 to G2 and the threshold for switching from G2 to G1 may be the same or different. Moreover, as noted above, the generation of the selection control signal for changing from gain G1 to G2 need not occur when analog-to-digital converter 232 saturates.

Figure 8B:
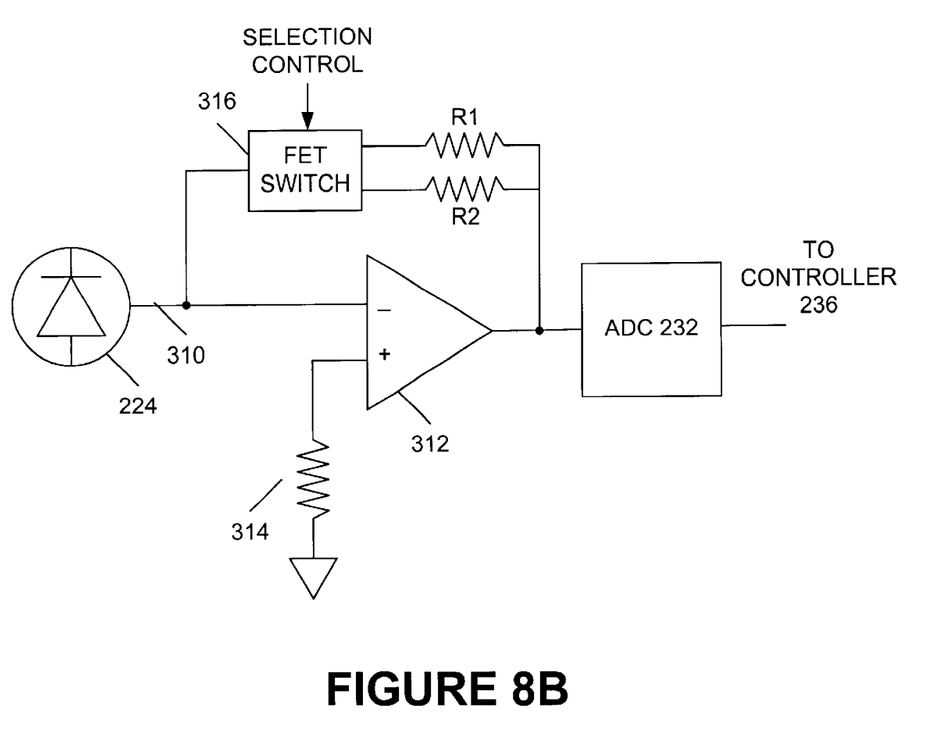
FIG. 8B is a diagram of an exemplary optical detector in accordance with the present invention.

FIG. 8B illustrates an exemplary embodiment of the optical detector of FIG. 8A. Photodetector 224 outputs a signal 310 to an inverting input of an operation amplifier 312. A non-inverting terminal of the operation amplifier 312 is coupled to ground via a resistor 314. Signal 310 output from photodetector 224 is also provided to a field effect transistor (FET) switch 316. Of course, any suitable switch may be used. Switch 316 is configurable by selection control signal into a first state and a second state. When in the first state, switch 316 couples the inverting input of operation amplifier 312 to the output of operational amplifier 312 through resistor R1. When in the second state, switch 316 couples the inverting input to the output of operation amplifier 312 through resistor R2. The selection control signal may be provided by controller 236, for example, as noted above. The output of operational amplifier 312 is also coupled to an input of analog-to-digital converter 232.

Resistors R1 and R2 have different resistive values. Accordingly, the output of the operational amplifier 312 produce a different gain G1 or G2 depending on whether switch 316 is in the first state or the second state. Of course, a third gain value G3 may be provided if switch 316 couples the inverting input to the output of the operational amplifier 312 through both resistors R1 and R2.

If the amplitude of signal 310 is relatively small, controller 236 may control switch 316 to the first state to provide a path through R1 and thus obtain a high gain value G1. If amplitude of signal 310 is relatively large, controller 236 may control switch 316 to the second state to provide a path through R2 and obtain a lower gain value G2. As noted above, controller 236 can interpret the output of analog-to-digital converter 232 based on whether the switch 316 is in the first state or the second state.

While an optical detector of a photodiode 224 and transimpedance amplifier 228 has been described above, it should be understood that any suitable optical detector arrangement may be used. Moreover, it is not necessary for the input to the analog-to-digital converter to derive from an optical detector. It should be understood that the input to the analog-to-digital converter may be any analog input signal having a large dynamic range.

Further, in the illustrative embodiments of FIGS. 2, 4, 5, and 6, the tap for the optical control components precedes the optical amplifier in the optical signal path. However, it should be understood that, in the alternative or in addition, an optical tap for optical control components may be provided after the optical amplifier in the optical signal path. The embodiments of FIGS. 4, 5, and 6 include two analog-to-digital converters for providing digital signals to the controller. Of course, more than two analog-to-digital converters may be provided. Similarly, while the embodiments of FIGS. 8A and 8B include two selectable gain regimes for the transimpedance amplifier 228, more than two gain regimes may be provided.

The present invention is described in the context of an optical amplifier. It should be understood that the present invention may be used in other contexts, for example, to provided control for a dispersion compensation module, an add/drop module, transmitter and/or receiver modules, optical switch, and optical multiplexers and demultiplexers, to name a few.

It will be understood that the foregoing is merely illustrative of the principles of this invention, and that various modifications can be made by those skilled in the art without departing from the scope and spirit of the invention. For example, optical signals may be amplified in other suitable wavelength ranges. Different pump arrangements and telemetry arrangements may also be used. Any suitable number of channels may be supported by the fibers in the system.

What is claimed is:

1. An optical amplifier comprising:
    at least one optical amplifier stage that amplifies an input optical signal to generate an amplified optical output signal;
    at least first and second analog-to-digital converters, the first analog-to-digital converter generating a first digital output signal from a first analog input signal and the second analog-to-digital converter generating a second digital output signal from a second analog input signal, wherein the first and second analog input signals are derived from a common analog signal; and
    a controller that selects one of the first and second digital output signal and generates a control signal that controls an amplification characteristic of the optical amplifier stage based on the selected digital output signal.

2. The optical amplifier of claim 1, wherein:
    the first analog-to-digital converter generates first digital output signals that are capable of covering the full dynamic range of the common analog signal,
    the second analog-to-digital converter generates second digital output signals that are capable of covering only a portion of the dynamic range of the common analog signal, and
    the second digital output signals provide finer resolution of the common analog signal than the first digital output signals.

3. The optical amplifier of claim 2, further comprising:
    a first optical tap that taps a portion of the power of the input optical signal, the first optical tap producing a first tapped optical signal from which the first analog input signal is derived; and a second optical tap that taps a portion of the power of the input optical signal, the second optical tap producing a second optical tap signal from which the second analog input signal is derived.

4. The optical amplifier of claim 2, further comprising:

an optical tap that taps a portion of the power of the input optical signal to produce a tapped optical signal;

an optical detector that detects the tapped optical signal and produces an analog electric signal, wherein the first and second analog input signals are derived from the analog electric signal.

5. The optical amplifier of claim 4, further comprising an amplifier that amplifies the analog electrical signal to produce an amplified analog electric signal, wherein the analog electric signal is provided to the first analog-to-digital converter as the first analog input signal and the amplified analog electric signal is provided to the second analog-to-digital converter as the second analog input signal.

6. The optical amplifier of claim 4, wherein the optical detector comprises:

a photodiode that receives the optical input signal and generates the analog electric signal;

a first processing circuit that receives the analog electric signal and produces the first analog input signal; and a second processing circuit that receives the analog electric signal and produces the second analog input signal, the second analog input signal differing from the first analog input signal.

7. The optical amplifier of claim 6, wherein the first processing circuit comprises a first transimpedance amplifier and the second processing circuit comprises a second transimpedance amplifier.

8. The optical amplifier of claim 1, wherein the at lease one optical amplifier stage comprises:

a pump laser that generates a pump signal, wherein the control signal from the controller controls the power of the pump signal so that the amplified optical signal approximates a constant gain per channel when the power of the input optical signal changes;

an optical coupler that combines the optical input signal and the pump signal to generate a combined output signal; and an erbium-doped fiber coil that receives the combined output signal and amplifies the optical input signal to produce the amplified optical signal.

9. The optical amplifier of claim 8, wherein the optical input signal comprises a wavelength division multiplexed optical signal having at least 40 optical channels.

10. The optical amplifier of claim 8, wherein the optical input signal comprises a wavelength division multiplexed optical signal having at least 100 optical channels.

11. A method of controlling an optical amplifier stage, comprising:

reading a first digital signal output by a first analog-to-digital converter;

reading a second digital signal output by a second analog-to-digital converter;

determining whether the second digital signal output has reached a predetermined value;

selecting the first digital signal if the second digital signal has reached the predetermined value;

selecting the second digital signal if the second digital signal has not reached the predetermined value;

adjusting at least one optical amplifier stage characteristic based on the selected digital signal.

12. The method of claim 11, wherein the predetermined value corresponds to a maximum value of the second digital signal.

13. The method of claim 11, wherein the step of adjusting comprises adjusting the at least one optical amplifier stage to approximate a constant per channel gain when the power of an optical signal input to the at least one amplifier stage changes.

14. The method of claim 11, wherein the step of adjusting comprises adjusting the power of a pump signal generated by a pump laser.

15. A fiber amplifier that amplifies optical signals in a fiber-optic communications link, wherein the optical signals vary over a dynamic range of powers, the fiber amplifier comprising:

at least one fiber;

at least one pump that optically pumps the fiber at a given pump power to provide optical gain for the optical signals;

a tap that taps the optical signals in the amplifier;

a photodetector that converts the tapped optical signals into analog electrical signals;

at least first and second analog-to-digital converters that convert the analog electrical signals into digital signals, wherein the first analog-to-digital converter covers the dynamic range of the optical input signals and wherein the second analog-to-digital converter covers less than the dynamic range of the optical input signals; and a controller that uses the digital signals to control the pump power.

16. The amplifier defined in claim 15 wherein the controller uses the digital signals to control the pump power to control transients in the optical gain.

* * * * *